United States Patent
Eddy et al.

(10) Patent No.: US 9,928,759 B2
(45) Date of Patent: Mar. 27, 2018

(54) APPARATUS FOR INFORMATIONAL LABEL DISPLAY

(71) Applicant: International Business Machines Corporation, Armonk, NY (US)

(72) Inventors: Kael B. Eddy, Lanesboro, MN (US); Clinton W. Erie, Adams, MN (US); Michael J. MacPherson, Eldin, MN (US); Patrick J. Reuvers, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/970,014

(22) Filed: Dec. 15, 2015

(65) Prior Publication Data

US 2017/0169740 A1    Jun. 15, 2017

(51) Int. Cl.
| | | |
|---|---|---|
| *G09F 3/18* | (2006.01) | |
| *G09F 3/10* | (2006.01) | |
| *G09F 3/00* | (2006.01) | |
| *G06F 1/18* | (2006.01) | |

(52) U.S. Cl.
CPC ............. *G09F 3/18* (2013.01); *G06F 1/182* (2013.01); *G09F 3/0297* (2013.01); *G09F 3/10* (2013.01)

(58) Field of Classification Search
CPC ..... G09F 3/10; G09F 3/02; G09F 3/18; G09F 3/0297; G09F 3/0288; G06F 1/182; B42F 13/006; B42F 13/0006; B42F 13/002; B42F 13/20

USPC ............. 361/679.03; 40/661, 661.06, 66.07, 40/299.01, 630, 638, 642.02, 661.09, 40/606.08, 606.15, 124.06
See application file for complete search history.

(56) References Cited

U.S. PATENT DOCUMENTS

| | | | | |
|---|---|---|---|---|
| 5,331,758 A | * | 7/1994 | Romick | ........... G09F 3/204 40/661 |
| 6,829,851 B2 | | 12/2004 | Oross et al. | |
| 8,281,929 B2 | | 10/2012 | Franks et al. | |
| 8,713,828 B2 | | 5/2014 | Striegel | |

(Continued)

FOREIGN PATENT DOCUMENTS

CN    102637382 A    8/2012

*Primary Examiner* — Anthony Haughton
*Assistant Examiner* — Ingrid Wright
(74) *Attorney, Agent, or Firm* — Cantor Colburn LLP; Tihon Poltavets

(57) ABSTRACT

An informational label apparatus for a product component includes a base affixable to a product component. A first portion of labelling information located at the product component is viewable through the base. A door operably connected to the base includes a second portion of labelling information. The first portion of labelling information is hidden from view when the door is in a closed position, and is viewable when the door is at an opened position. A component of a computer machine includes an electronic component including component identification information affixed thereto. A cover is secured over the component identification information and includes a base secured to the electronic component. A door operably connected to the base includes computer machine identification information. The component identification information is hidden from view when the door is at a closed position, and is viewable when the door is at an opened position.

20 Claims, 2 Drawing Sheets

(56) References Cited

U.S. PATENT DOCUMENTS

| | | | |
|---|---|---|---|
| 9,154,642 B2 | 10/2015 | Oyster et al. | |
| 2003/0196363 A1* | 10/2003 | Amdahl | G09F 3/20 |
| | | | 40/667 |
| 2005/0195517 A1* | 9/2005 | Brace | G11B 15/6835 |
| | | | 360/92.1 |
| 2006/0150458 A1* | 7/2006 | Feroli | G09F 3/18 |
| | | | 40/661 |
| 2008/0276504 A1 | 11/2008 | Cloninger | |
| 2012/0137959 A1* | 6/2012 | Kwak | G09F 3/0291 |
| | | | 116/206 |
| 2013/0099004 A1* | 4/2013 | Alo | G06K 19/07327 |
| | | | 235/492 |
| 2015/0187234 A1 | 7/2015 | Atkinson et al. | |

\* cited by examiner

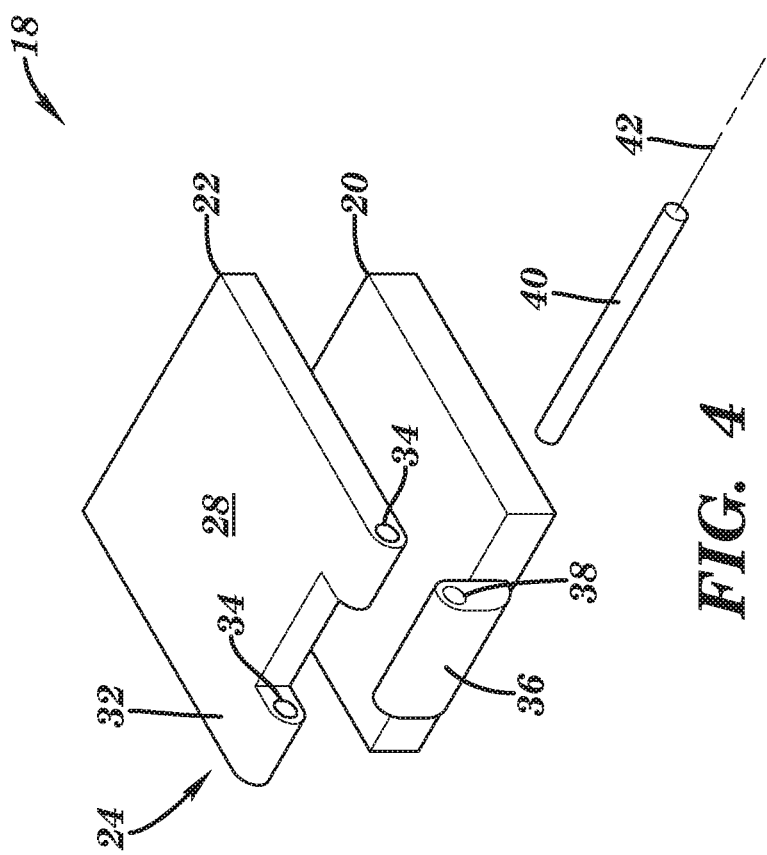
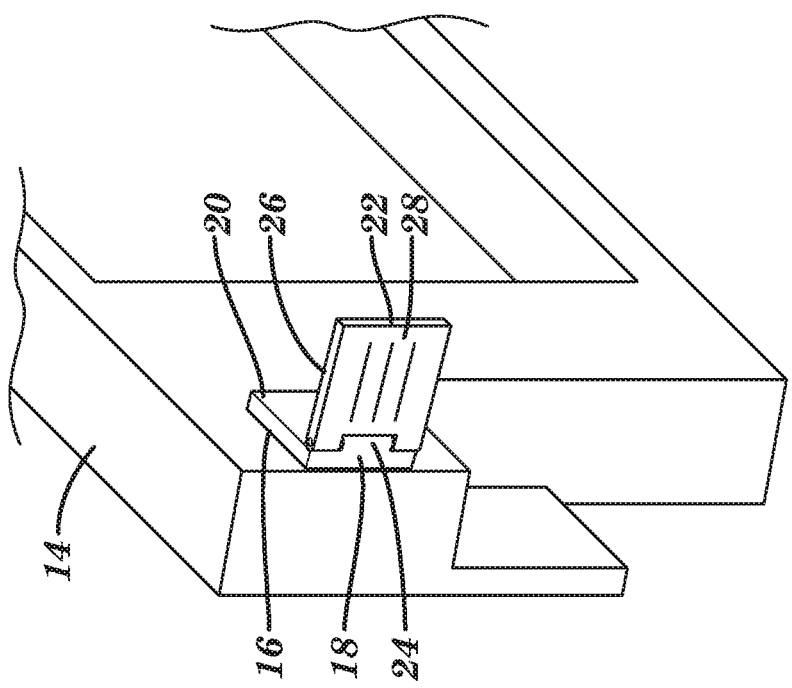

APPARATUS FOR INFORMATIONAL LABEL DISPLAY

BACKGROUND

The present invention relates to informational or product labelling, and more specifically to apparatus for display of multiple product labels.

In many industrial or consumer products, product labelling of model number, serial number, and/or other information is required or desired for a variety of reasons, such as for ease of reference by service or maintenance personnel. Some products are assembled from multiple components or subassemblies, each having their own identifier, such as model number or serial number.

There are many typical approaches to labelling such products. One is referred to as "over labelling", where an assembly or "parent" product label is placed directly over a subassembly or "child" label, obscuring or destroying the child label in the process. In this case, information regarding the child is lost, which can be problematic for import/export certifications, maintenance, and cancelled or returned orders. Another typical solution is to apply parent labels in addition to child or component labels, often adjacent to each other. This often creates confusion for the customer and requires an increased area of product surface for labelling, that then may not be used for other product functions. A third approach applies only a parent label to the product, and assumes certain child components are part of the assembly. This approach is problematic when components are added or removed after the parent label is applied, since the label no longer represents the actual configuration of the parent.

SUMMARY

In one embodiment, an informational label apparatus for a product component includes a base affixable to a product component. A first portion of labelling information located at the product component is viewable through the base. A door is operably connected to the base and includes a second portion of labelling information. The first portion of labelling information is hidden from view when the door is in a closed position, and the first portion of labelling information is viewable when the door is moved to an opened position.

In another embodiment, a component of a computer machine includes an electronic component including component identification information affixed thereto. A cover is secured over the component identification information and includes a base secured to the electronic component and a door operably connected to the base including computer machine identification information. The component identification information is hidden from view when the door is in a closed position, and the component identification information is viewable when the door is moved to an opened position.

In yet another embodiment, a computer machine includes a plurality of electronic components in operable communication with each other. Each electronic component includes component identification information affixed to the electronic component and a cover secured over the component identification information. The cover includes a base secured to the electronic component and a door operably connected to the base including computer machine identification information. The component identification information is hidden from view when the door is in a closed position, and the component identification information is viewable when the door is moved to an opened position.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is another partial perspective view of a component for a product including product and component labelling; and FIG. 4 is an exploded view of a cover for labelling of a product.

DETAILED DESCRIPTION

Figure 1:
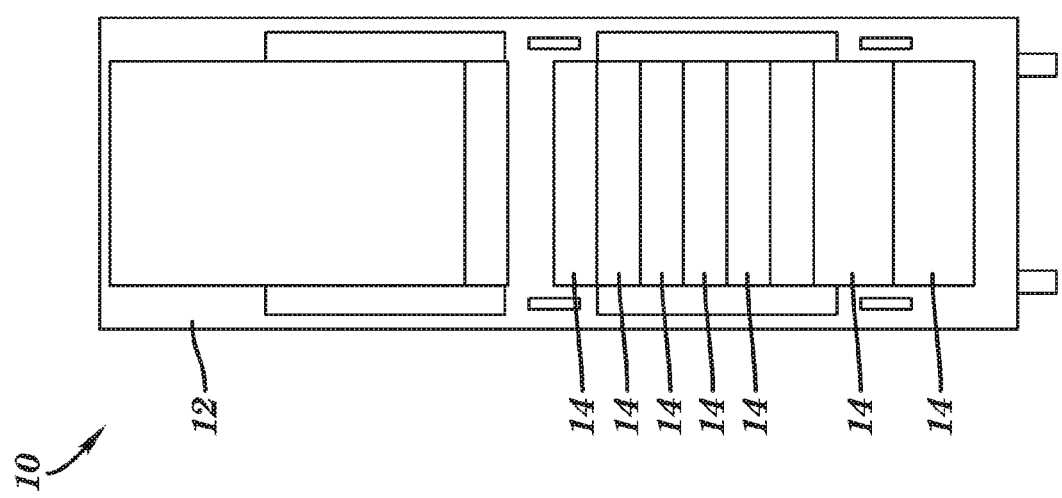
FIG. 1 is a schematic view of an embodiment of a product having a plurality of components.

Referring to FIG. 1, an example of a product 10 is illustrated. The product 10 illustrated is a computer machine product, but it is to be appreciated that many other types of products may benefit from the present disclosure. The product 10 includes a frame 12 with a plurality of product components 14 arranged in the frame 12, with the plurality of product components 14 secured thereat. The product components 14 may be operably connected to each other such that, together, the plurality of product components 14 comprise the product 10. In the embodiment illustrated, the frame 12 is a computer rack and the plurality of product components 14 are a plurality of electronic computer components.

Figure 2:
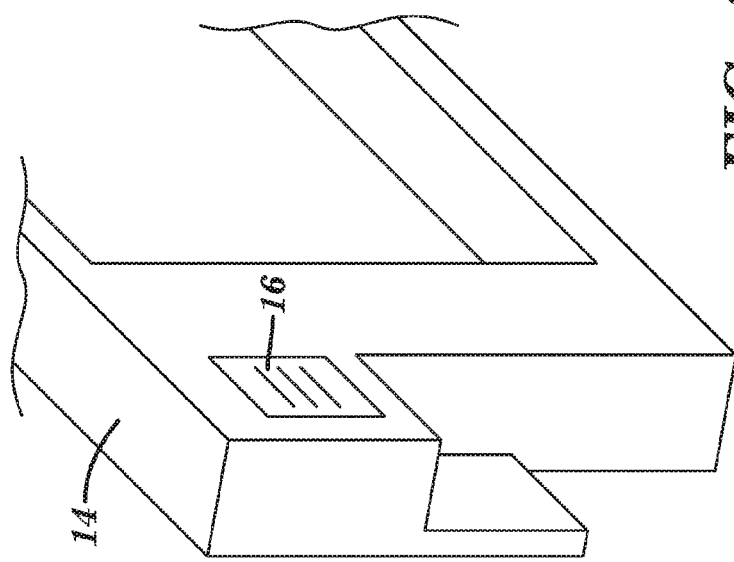
FIG. 2 is a partial perspective view of a component for a product including product and component labelling.

Referring to FIG. 2, each product component 14 includes component identification information. The component identification information may include component type, model number, serial number, batch number, manufacturing date, and/or other information to identify the product component 14. In some embodiments, the component identification information may be represented in alphanumeric characters, bar code, a quick recognition (QR) code, or other symbols or a combination thereof. In some embodiments, the component identification information may be included on a component label 16 affixed to the product component 14 via, for example, and adhesive. Alternatively or additionally, the component identification information may be applied to the product component 14 by other means, such as etching, stamping, embossing, may be incorporated into a plastic molded portion of the product component, or may be included on a plate affixed to the product component 14 via screws, rivets or other mechanical fastening means.

It is desired to also include product 10 identification information at each product component 14. Further, it is desired to provide the product 10 identification information without obscuring the component identification information while still minimizing space at the component 14 utilized for such information. The product 10 identification information may include product type, model number, serial number, batch number, manufacturing date, and/or other information to identify the product 10. In some embodiments, the product 10 identification information may be represented in alphanumeric characters, bar code, QR code, or other symbols or a combination thereof.

Referring now to FIG. 3, shown is an embodiment of an apparatus configured to display product 10 identification information while not obscuring product component 14 identification information on the component label 16. The apparatus is a cover 18 including a base 20 and a door 22 secured to the base 20 via a hinge 24. The base 20 is positioned over the component label 16, with the component label 16 being readable through the base 20, which if formed from a material with a high degree of transparency. In some embodiments, the base 20 is formed from a transparent material. In some embodiments, the base 20 is formed from an acrylic material and is affixed to the product component 14 via a transparent adhesive to allow reading of the component label 16 through the base 20.

The door 22 includes a door inner surface 26, which faces the base 20 when the door 22 is in a closed position, and a door outer surface 28. The door outer surface 28 includes the product 10 identification information on a product label 30 affixed to the door outer surface 28 via adhesive. Alternatively or additionally, the product 10 identification information may be applied to the door outer surface 28 by other means, such as etching, stamping, embossing, may be incorporated into a plastic molded portion of the door 22, or may be included on a plate affixed to the door 22 via screws, rivets or other mechanical fastening means. While in the embodiment shown in FIG. 3, the product 10 identification information is located at the door outer surface 28, in other embodiments the product 10 identification information may be located at the door inner surface 26. Further, in other embodiments a first portion of the product 10 identification information may be located at the door outer surface 28, while a second portion of the product 10 identification information may be located at the door inner surface 26.

In some embodiments, other information may be included on the door 22 in addition to or as an alternative to the product 10 identification information. For example, customers often add components to products that were not part of the original product 10 configuration. In such instances, the door 22 may include information stating that the particular component 14 to which the cover 18 is affixed was not part of original product 10.

Referring now to FIG. 4, an exploded view of the cover 18 is shown. The hinge 24 includes a door hinge portion 32 including a plurality of door pin openings 34 and a base hinge portion 36 including one or more base pin openings 38. A hinge pin 40 is inserted through the door pin openings 34 and the base pin openings 38 to secure the door 22 to the base 20, but allowing for rotation of the door 22 about a pin axis 42. It is to be appreciated, however, that other hinge 24 configurations are contemplated within the scope of the present disclosure.

Utilizing the cover 18 disclosed herein defines a hierarchy of product labelling within product 10, with product 10 identification information displayed on the door 22 and component 14 identification information located at the component 14 under the cover 18, but still viewable when the door 22 is moved to an opened position. The cover 18 allows display of both product 10 identification information and component 14 identification information in a space of one label 16, preserving space at the component 14 for other uses. Further, the component 14 identification information is not damaged or destroyed by application of the cover 18 or removal of the cover 18. Thus, if a component 14 is removed from a first product 10 and installed in a second product 10, a first cover 18 associated with the first product 10 may be removed and replaced with a second cover 18 associated with a second product 10 without damaging the underlying label 16.

In using the cover 18, the component or "child" label and corresponding information is preserved and not obscured or destroyed. Further, customer confusion between product labelling and component labelling is reduced since the labelling hierarchy is better defined by the cover 18. Finally, both the "parent" product information and the "child" component information are both retained, so that as components are added or removed from the product, information on the actual configuration of the parent is maintained.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An informational label apparatus for a product component comprising:
   a base affixable to a product component, component identification information disposed at the product component viewable through the base; and
   a door operably connected to the base including computer machine identification information;
   wherein the component identification information is hidden from view when the door is in a closed position, and the component identification information is viewable through the base when the door is moved to an opened position.

2. The informational label apparatus of claim 1, wherein the base is formed from a transparent material.

3. The informational label apparatus of claim 2, wherein the transparent material is an acrylic material.

4. The informational label apparatus of claim 1, wherein the door is operably connected to the base via a hinged connection.

5. The informational label apparatus of claim 1, wherein the component identification information is affixed to the door via an adhesive.

6. The informational label apparatus of claim 1, wherein the component identification information includes one or more of alphanumeric information, a bar code or a QR code.

7. A component of a computer machine, comprising:
   an electronic component including component identification information affixed thereto; and
   a cover secured over the component identification information, the cover including:
   a base secured to the electronic component; and
   a door operably connected to the base including computer machine identification information;
   wherein the component identification information is hidden from view when the door is in a closed position, and the component identification information is viewable through the base when the door is moved to an opened position.

8. The component of claim 7, wherein the base is formed from a transparent material.

9. The component of claim 8, wherein the transparent material is an acrylic material.

10. The component of claim 7, wherein the door is operably connected to the base via a hinged connection.

11. The component of claim 7, wherein the computer machine identification information is affixed to the door via an adhesive.

12. The component of claim 7, wherein the computer machine identification information includes one or more of alphanumeric information, a bar code or a QR code.

13. The component of claim 7, wherein the component identification information is affixed to the door via an adhesive.

14. The component of claim 7, wherein the component identification information includes one or more of alphanumeric information, a bar code or a QR code.

15. The component of claim 7, wherein the component identification information includes component type, model number, serial number, batch number and/or manufacturing date.

16. A computer machine, comprising a plurality of electronic components in operable communication with each other, each electronic component including:
   component identification information affixed to the electronic component; and
   a cover secured over the component identification information, the cover including:
      a base secured to the electronic component; and
      a door operably connected to the base including computer machine identification information;
      wherein the component identification information is hidden from view when the door is in a closed position, and the component identification information is viewable through the base when the door is moved to an opened position.

17. The computer machine of claim 16, wherein the door is operably connected to the base via a hinged connection.

18. The computer machine of claim 16, wherein the computer machine identification information includes one or more of alphanumeric information, a bar code or a QR code.

19. The computer machine of claim 16, wherein the component identification information includes one or more of alphanumeric information, a bar code or a QR code.

20. The computer machine of claim 16, wherein the component identification information includes component type, model number, serial number, batch number and/or manufacturing date.

* * * * *